(12) United States Patent
Parekh

(10) Patent No.: US 10,419,476 B2
(45) Date of Patent: Sep. 17, 2019

(54) METHOD AND SYSTEM FOR EMAIL PRIVACY, SECURITY, AND INFORMATION THEFT DETECTION

(71) Applicant: Sanjay M. Parekh, Duluth, GA (US)

(72) Inventor: Sanjay M. Parekh, Duluth, GA (US)

(*) Notice: Subject to any disclaimer, the term of this patent is extended or adjusted under 35 U.S.C. 154(b) by 223 days.

(21) Appl. No.: 14/868,008

(22) Filed: Sep. 28, 2015

(65) Prior Publication Data

US 2016/0094566 A1 Mar. 31, 2016

Related U.S. Application Data

(60) Provisional application No. 62/055,847, filed on Sep. 26, 2014.

(51) Int. Cl.
| | |
|---|---|
| *H04L 29/06* | (2006.01) |
| *H04L 12/58* | (2006.01) |
| *G06F 21/36* | (2013.01) |

(52) U.S. Cl.
CPC .......... *H04L 63/145* (2013.01); *H04L 51/12* (2013.01); *H04L 51/28* (2013.01); *H04L 63/0414* (2013.01); *H04L 63/1483* (2013.01); *G06F 21/36* (2013.01); *G06F 2221/2133* (2013.01); *H04L 63/08* (2013.01)

(58) Field of Classification Search
CPC ..... H04L 51/28; H04L 63/08; H04L 63/0414; H04L 63/1483; H04L 63/1466; H04L 51/12; H04L 63/145; H04L 51/36; H04L 63/105; G06F 2221/2133; G06F 21/36
See application file for complete search history.

(56) References Cited

U.S. PATENT DOCUMENTS

| | | | |
|---|---|---|---|
| 7,218,921 B2* | 5/2007 | Mendiola | H04L 29/12009 455/414.1 |
| 2002/0188689 A1 | 12/2002 | Chung | |
| 2003/0120733 A1* | 6/2003 | Forman | H04L 51/28 709/206 |
| 2005/0144239 A1 | 6/2005 | Mattathil | |
| 2006/0200487 A1 | 9/2006 | Adelman et al. | |
| 2007/0271348 A1 | 11/2007 | Yang | |
| 2007/0283000 A1 | 12/2007 | Proux | |
| 2008/0005786 A1 | 1/2008 | Dreymann | |
| 2008/0060062 A1 | 3/2008 | Lord | |
| 2008/0060063 A1 | 3/2008 | Parkinson | |
| 2008/0189770 A1 | 8/2008 | Sachtjen | |
| 2009/0138711 A1 | 5/2009 | Heimbigner | |

(Continued)

FOREIGN PATENT DOCUMENTS

WO WO2008/015669 2/2008

*Primary Examiner* — Amir Mehrmanesh
(74) *Attorney, Agent, or Firm* — Smith Gambrell & Russell, LLP; Gregory J. Kirsch; Matthew P. Warenzak

(57) ABSTRACT

A system and method is proposed for managing email messages across a network. The system provides multiple means of verifying an originating sender of email. In addition, the system automatically generates unique email addresses as a means mask the email address of an original sender and shield users from unwanted email. The system may also be configured to block email security threats (e.g. phishing, spear phishing, etc.). Further, the system provides means of processing email messages to enable encryption, spam detection, geographical location identification of users, and social networking.

27 Claims, 18 Drawing Sheets

(56) References Cited

U.S. PATENT DOCUMENTS

| | | | |
|---|---|---|---|
| 2010/0023585 A1* | 1/2010 | Nersu | G06Q 10/107 709/206 |
| 2014/0250526 A1* | 9/2014 | Khanna | G06F 21/552 726/22 |
| 2015/0296368 A1* | 10/2015 | Kaufman | H04W 8/18 455/418 |

* cited by examiner

METHOD AND SYSTEM FOR EMAIL PRIVACY, SECURITY, AND INFORMATION THEFT DETECTION

CLAIM OF PRIORITY

This application claims priority from U.S. Provisional Patent Application 62/055,847, filed Sep. 26, 2014, which is relied upon and incorporated herein in its entirety by reference.

FIELD OF THE INVENTION

The present invention generally relates to a method and system for automatically generating unique email addresses as a way to shield users from unwanted email (junk, spam, or other unwanted email) as well as blocking email security threats (phishing, spear phishing, etc.). Unwanted emails are further analyzed to understand what users are leaking contact information to others as a way to identify security issues.

BACKGROUND OF THE INVENTION

Internet users may use one or more email addresses but generally limit their use to a handful of addresses. These addresses are used for different purposes ranging from personal email, work email, email addresses for websites, and other uses. All of these addresses are given to a wide range of senders within that use case. For personal email, the address may be given to friends, family members, and acquaintances. This means that dozens, if not hundreds or thousands, of people or services know a single email address to contact an individual. If any of these individuals begin sending unwanted email or if their accounts are compromised and a recipient's address is harvested by identity thieves or spammers, the individual whose information has been compromised or is being misused has no method of stopping the tide of unwanted email other than changing their email address. If a user does change their email address they would need to inform all of their contacts of the change of address which opens them up to the same issue in the future. This is a cumbersome approach to solving the problem to maintaining email address security and privacy and does not accomplish the goal aside from a small window of time when no information is compromised.

Prior art exists in the form of detecting spam and unwanted email after this email is already delivered to the user. This type of ability is employed by most major email service providers and many independent companies focus solely on rating the validity of an email based on various factors including content, subject line, sender address, sender location, etc. But these approaches do not take an active approach to validating senders before accepting their email content for delivery to the recipient.

SUMMARY OF THE INVENTION

System and Methods consistent with the present invention, as embodied and broadly described herein, provide email communication privacy and security while detecting information theft. The system comprises: an email server, wherein the email server accepts emails universally on a generated email address; an application server, wherein the application server verifies the validity of an email address for one or more user sending email, and; a database, wherein the database stores pertinent system information and email management information. Disclosed are means of processing email messages to enable encryption, spam detection, geographical location identification of users, social networking and more.

DETAILED DESCRIPTION OF THE INVENTION

Figure 1:
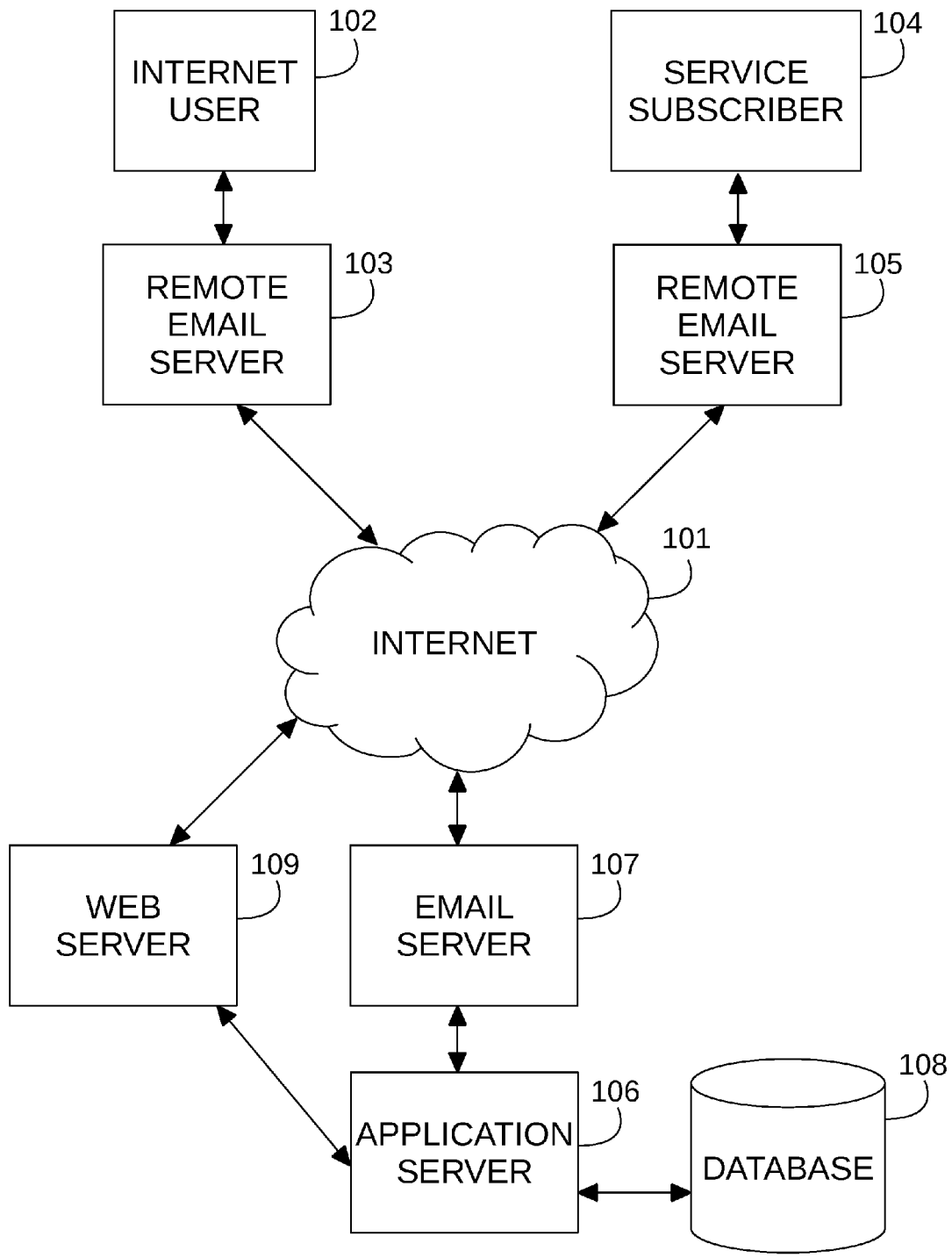
FIG. 1 is a block diagram of the system according to embodiments of the present invention.

Embodiments of the invention will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the following description, numerous specific details are set forth. However, it is to be understood that embodiments of the invention may be practiced without these specific details. In other instances, well-known methods, structures and techniques have been shown in detail in order not to obscure an understanding of this description.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed systems and methods. These and other components are disclosed herein, and it is understood that when combinations, subsets, interactions, groups, etc., of these components are disclosed that while specific reference of each various individual and collective combinations and permutation of these may not be explicitly disclosed, each is specifically contemplated and described herein, for all systems and methods. This applies to all aspects of this application including, but not limited to, steps in disclosed methods. Thus, if there are a variety of additional steps that can be performed, it is understood that each of these additional steps can be performed with any specific embodiment or combination of embodiments of the disclosed methods.

Disclosed are a method, system, and service that enable email communication privacy and security while detecting information theft employing distinct types of email addresses to make the system work.

FIG. 1 is a block diagram of the secure, private, information theft detecting (SPITD) system 100 according to embodiments of the present invention. The SPITD system is configured to monitor and organize email communication between regular internet users 102 and subscribers 104 to the service provided by the SPITD system 100. Subscribers 104 to the service are Internet users, which may represent one or more users. Internet users (i.e., non-subscribers) 102 can communicate with service subscribers 104 via the internet 101, and vice versa, which may represent one or more users. Both subscribers 104 and non-subscribers 102 may or may not share a common email server or may utilize different remote email servers 103 and 105. The SPTID system 100 consists of an email server 107, an application server 106, and a database 108. The service may also include a web server 109 for subscriber information and configuration purposes.

Figure 2:
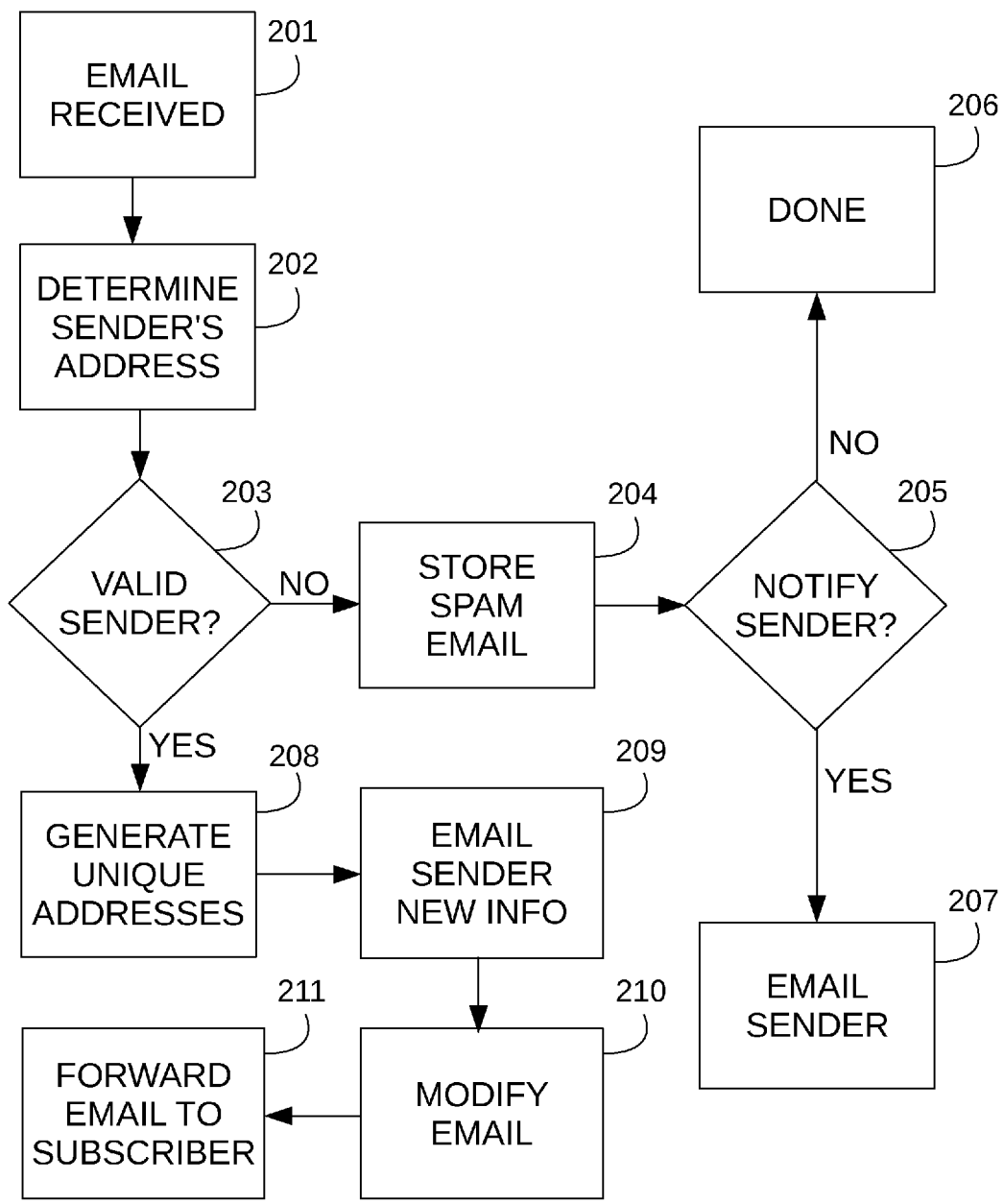
FIG. 2 is a flowchart detailing email process steps performed by an application server according to embodiments of the present invention.

In an aspect, subscribers 104 are assigned one or more generic email address (e.g., sanjay@example.com). The mapping of which generic email address is assigned to which user is stored in database 108. The email server 107 accepts email for the generic email addresses and, as shown in FIG. 2, transmits the email to the application server 106 for processing (step 201). If the delivery address is a generic email address, the application server 106 processes the email to determine if the address of the sender 102 (step 202) can be verified as a valid sender (step 203). A valid sender 102 may be defined as someone or a service not sending spam, malicious material, or any other unwanted communication as determined by the application server 106 and/or the subscriber 104. If the sender 102 is determined not to be a valid sender, the email can be stored as spam email (step 204). The system 100 can then determine whether or not to notify the sender (step 205), which results in either a determination to not send an email (step 206) or email notifying the sender of the email being identified as spam (step 207).

If the application server 106 verifies the email sender 102 as a valid sender (step 203), the application server 106 can generate one or more unique email addresses associated with the sender 102 (step 208). Once the unique email addresses are generated, the email server 107 can then email the sender 102 the new information (step 209). For example, the application server 106 sends an email to the sender 102 (via the email server 107) with instructions detailing that in the future the sender 102 should use the new unique email address to contact the recipient. The unique email address is tied to the sender's email address so that no one else can use the unique email address to directly contact the intended recipient. In aspect, the email server 107 can then modify the email (step 210), and then forward the email to the subscriber 104 (step 211). These steps are described in detail below.

The application server 106 may verify the originating sender (see step 203) through one or more methods including, but not limited to: automatic email response to verify sender address deliverability; automatic email response with a URL link to a verification page; automatic email response with URL link to a verification page that includes a CAPTCHA type challenge; verification of sender as valid based on valid sending to other users of the system; verification of DKIM headers in the received email; verification of SPF headers in the received email; verification of the sender's location through IP address location technology; and verification of the originating sender's email relevant header information. Each of these methods is disclosed in detail below.

Automatic Email Response to Verify Sender Address Deliverability

Figure 3:
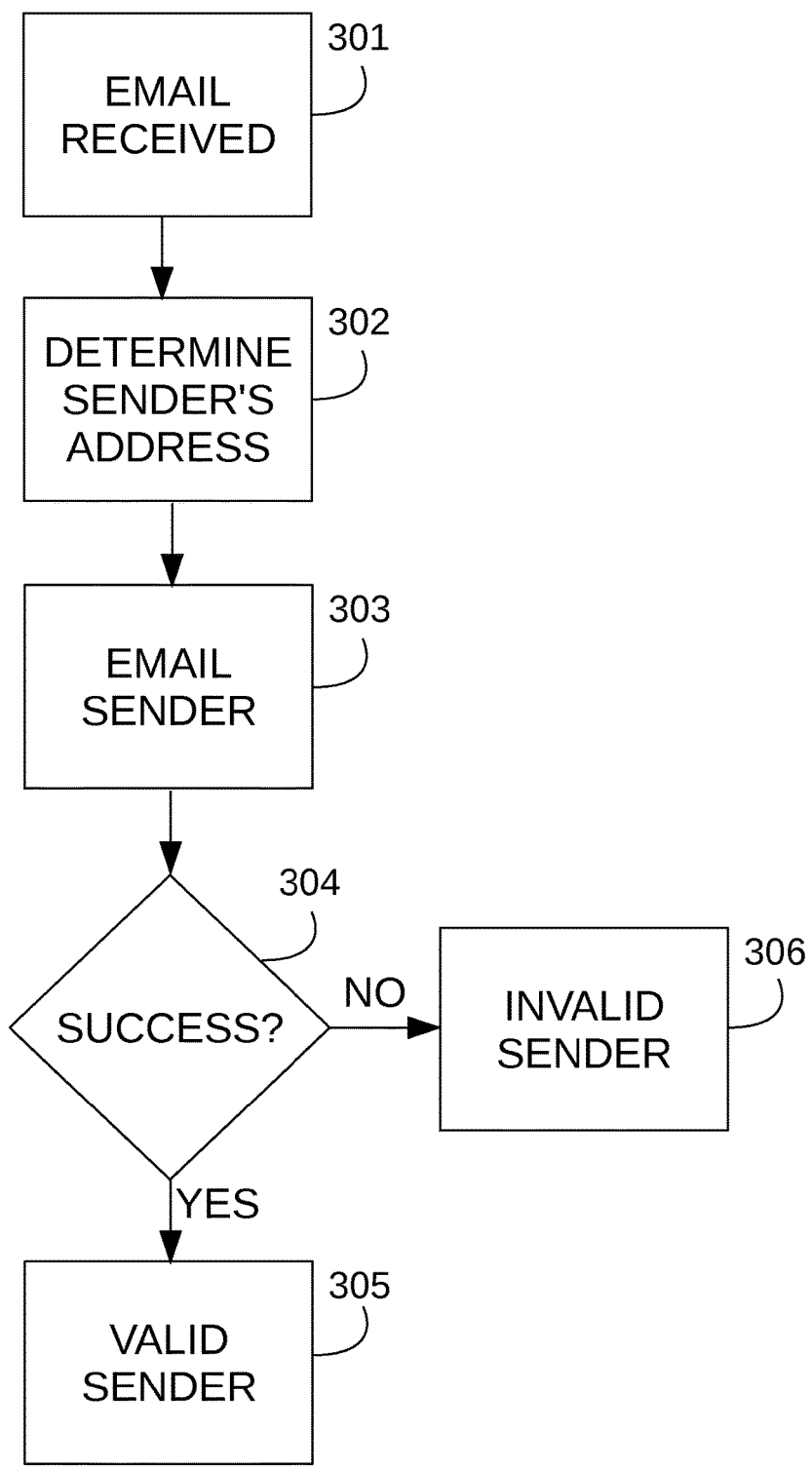
FIG. 3 is a flowchart detailing steps undertaken by an application server to verify an originating email sender using an automatic email response to verify sender address deliverability according to embodiments of the present invention.

Referring to FIG. 3, when the application server 106 receives an email from a sender 102 (step 301), it will first determine the sender's address (step 302). The application server 106 will form a verification email and send the email via the email server 107 to the sender 102 (step 303). The email server 107 will then determine if the email was successfully delivered (step 304). If the email server 107 reports successful delivery of the email, the sender 102 is reported as a valid sender (step 305). If the email server 107 reports delivery failure, the sender 102 is reported as an invalid sender (step 306). Originating senders who use an improper, fictional, or mis-configured return address would fail this test.

Automatic Email Response with a URL Link to a Verification Page

Figure 4:
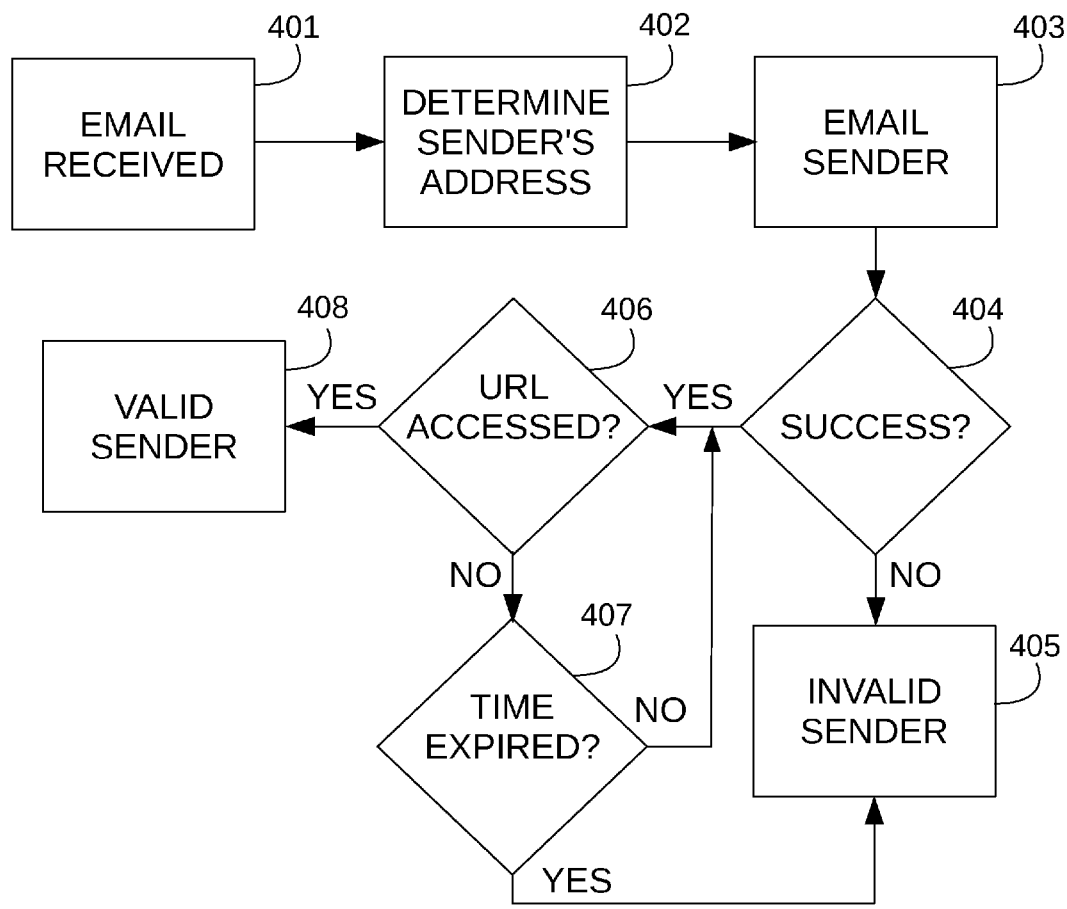
FIG. 4 is a flowchart detailing steps undertaken by an application server to verify an originating email sender using automatic email response with a URL link to a verification page according to embodiments of the present invention.

Referring to FIG. 4, when the application server 106 receives an email from a sender 102 (step 401), it will first determine the sender's address (step 402). The application server 106 will form an email with a unique URL link and send the email via the email server 107 to the sender 102 (step 403). The email server 107 then will determine if the email was successfully delivered (step 404). If the email server 107 reports unsuccessful delivery of the email, the sender 102 is reported as an invalid sender (step 405). If the email server 107 reports delivery success, the web server 109 awaits for the sender to access the unique URL (step 406). The web server 109 will then determine if the URL is accessed (step 406). If the URL has not been accessed, the web server 109 checks to see if time has expired (step 407). If time has expired for the sender 102 to visit the URL, the sender 102 is reported as an invalid sender (step 405). If time has not expired, then the web server 109 continues to wait for the sender 102 to access the URL (step 406). Once the sender 102 accesses the URL within a valid amount of time, the sender 102 is reported as valid (step 408).

Figure 5:
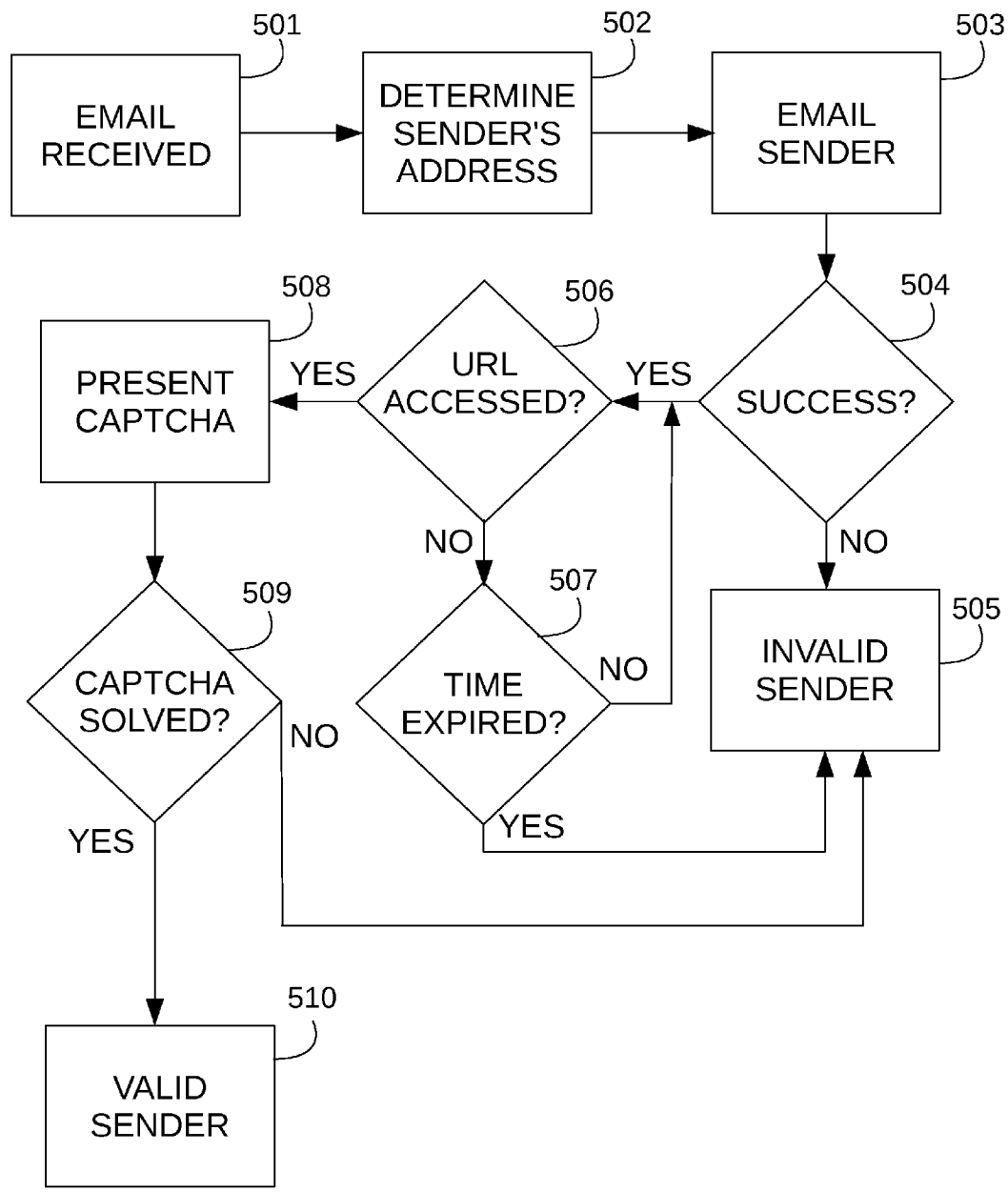
FIG. 5 is a flowchart detailing steps undertaken by an application server to verify an originating email sender using automatic email response with URL link to a verification page that includes a CAPTCHA according to embodiments of the present invention.

Automatic Email Response with URL Link to a Verification Page that Includes a Completely Automated Public Turing Test to Tell Computers and Humans Apart (CAPTCHA) Type Challenge Referring to FIG. 5, when the application server 106 receives an email from a sender 102 (step 501), it will first determine the sender's address (step 502). The application server 106 will form an email with a unique URL link and send the email via the email server 107 (step 503). The email server 107 will then determine if the email was successfully delivered (step 504). If the email server 107 reports unsuccessful delivery of the email, the sender is reported as an invalid sender (step 505). If the email server 107 reports delivery success, the web server 109 awaits for the sender to access the unique URL (step 506). The application server 106 will then determine if the URL is accessed (step 506). If the URL has not been accessed, the application server 106 checks to see if time has expired (step 507). If time has expired for the sender 102 to visit the URL (step 507), the sender 102 is reported as an invalid sender (step 505). If time has not expired, then the web server 109 continues to wait for the sender 102 to access the URL (step 506). When the sender 102 accesses the URL within a valid amount of time, the sender 102 is presented with a page with a CAPTCHA challenge to ensure that the sender 102 is a human and not a bot or script (step 508). The web server 109 will then determine if the CAPTCHA is successfully solved (step 509). If the CAPTCHA is not successfully solved then the sender is reported as an invalid sender (step 505). If the CAPTCHA is successfully solved then the sender is reported as a valid sender (step 510).

Figure 6:
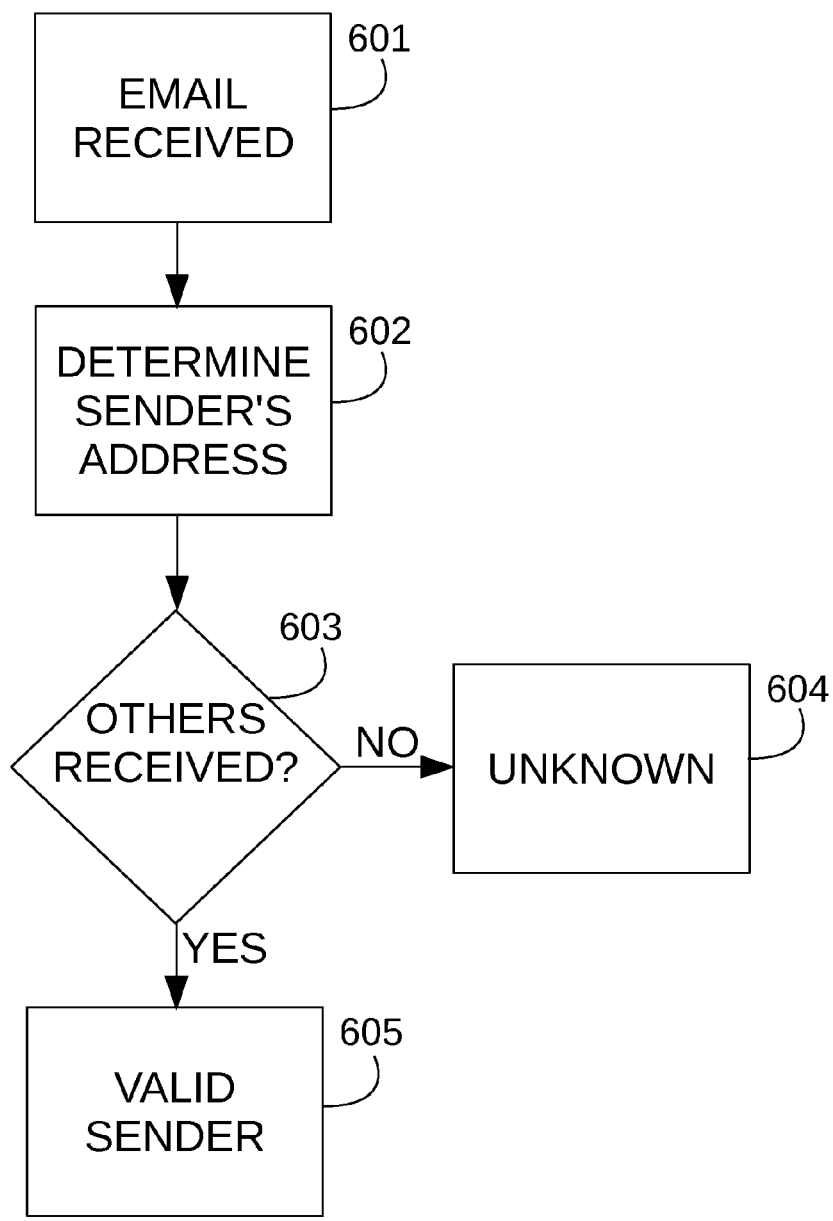
FIG. 6 is a flowchart detailing steps undertaken by an application server to verify an originating email sender where verification of sender as valid is based on valid sending to other users of the system according to embodiments of the present invention.

Verification of Sender as Valid Based on Valid Sending to Other Users of the System Referring to FIG. 6, when the application server 106 receives an email from a sender 102 (step 601), it will first determine the sender's address (step 602). The application server 106 will query the database 108 to determine if other subscribers of the service have successfully received valid emails from the sender 102 (step 603). If the application server 106 determines that the sender 102 has never sent an email to any subscriber the validity of the sender remains unknown (step 604). If the application server 106 determines that the sender 102 has successfully sent an email to one or more subscriber the validity of the sender 102 is reported as a valid sender (step 605).

Verification of DKIM Headers in the Received Email

Figure 7:
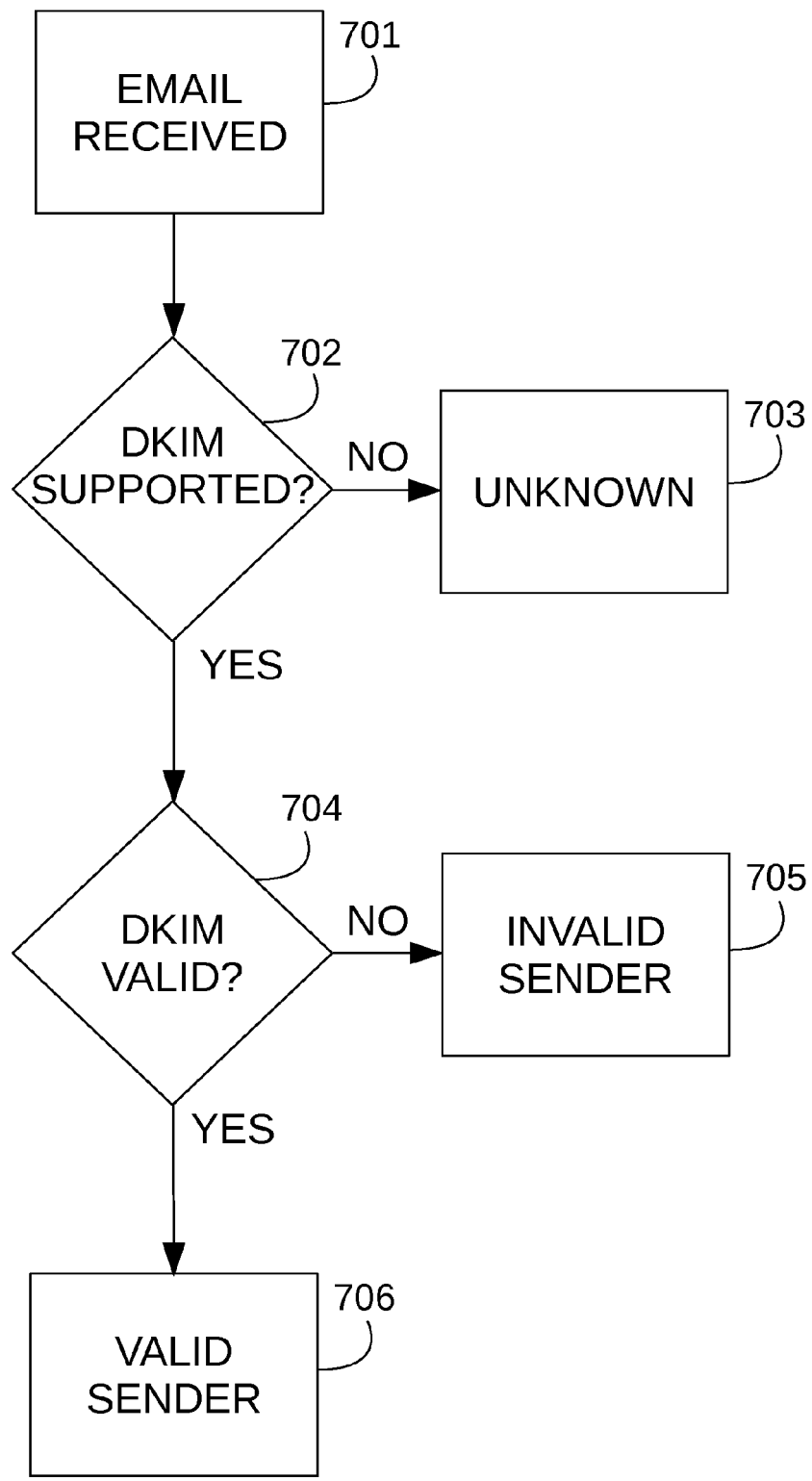
FIG. 7 is a flowchart detailing steps undertaken by an application server to verify an originating email sender through verification of DKIM (DomainKeys Identified Mail) headers in a received email according to embodiments of the present invention.

DKIM (DomainKeys Identified Mail) is an email validation system designed to detect email spoofing by checking a digital signature against a DNS published key. Referring to FIG. 7, when the application server 106 receives an email from a sender 102 (step 701), the application server 106 will first determine if the email supports DKIM verification (step 702). If the email does not support DKIM validation, the validity of the sender remains unknown (step 703). If the email supports DKIM validation, the DKIM signature is checked (step 704). If the application server 106 determines that the DKIM validation is false, the sender 102 is reported as an invalid sender (step 705). If the application server 106 determines that the DKIM validation is true, the sender 102 is reported as a valid sender (step 706). In an aspect, success or failure of the verification method may require additional verification checks to be certain of a final disposition.

Verification of SPF Headers in the Received Email

Figure 8:
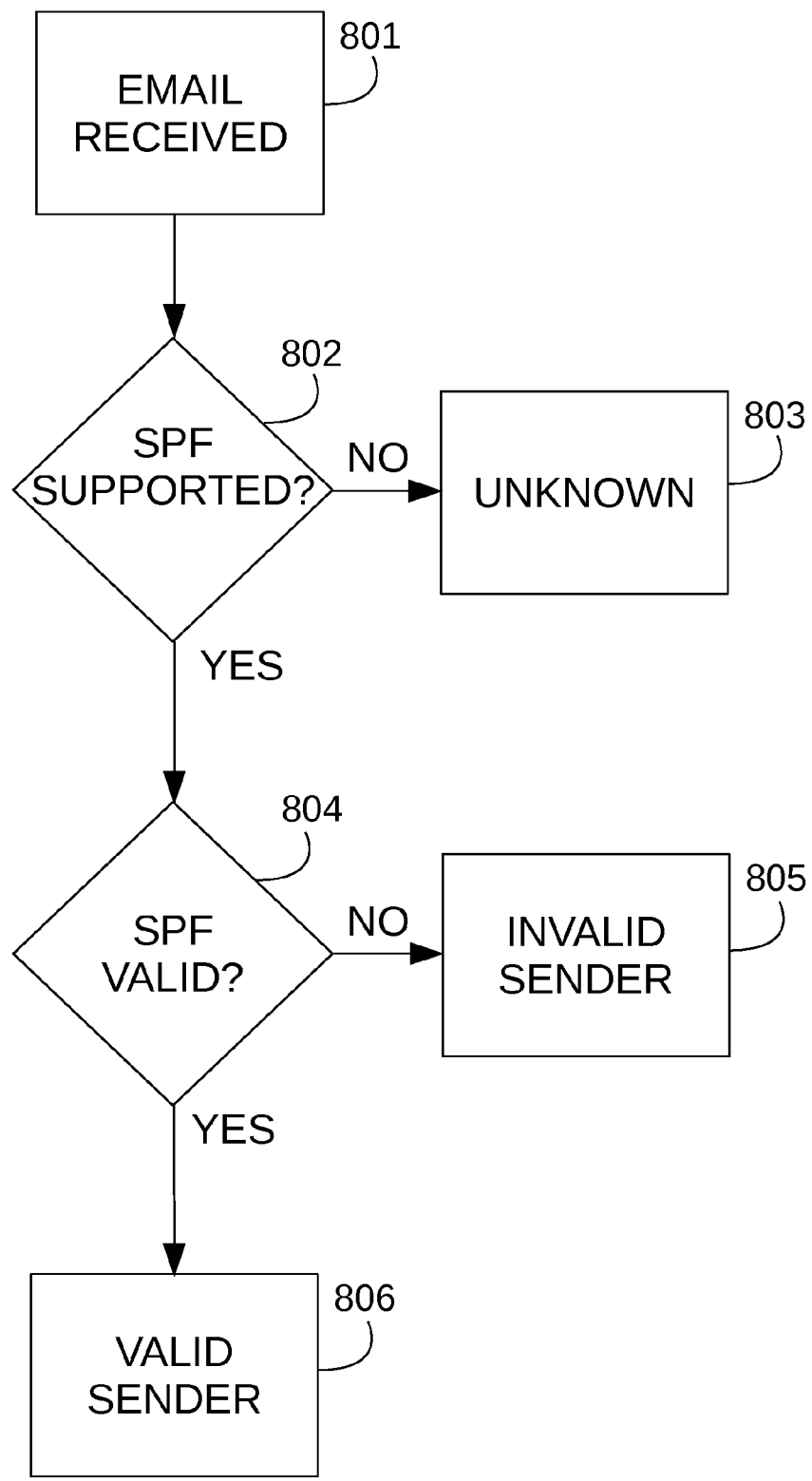
FIG. 8 is a flowchart detailing steps undertaken by an application server to verify an originating email sender through verification of SPF headers in a received email according to embodiments of the present invention.

SPF (Sender Policy Framework) is an email validation system designed to detect email spoofing by verifying that email is being sent from an authorized host machine. Referring to FIG. 8, when the application server 106 receives an email from a sender 102 (step 801), the application server 106 determines if the email supports SPF verification (step 802). If the email does not support SPF validation, the validity of the sender remains unknown (step 803). If the email supports SPF validation, the SPF signature is checked (step 804). If the application server 106 determines that the SPF validation is false, the sender 102 is reported as an invalid sender (step 805). If the application server 106 determines that the SPF validation is true, the sender 102 is reported as a valid sender 102 (step 806). In an aspect, success or failure of the verification method may require additional verification checks to be certain of a final disposition.

Verification of the Sender's Location Through IP Address Location Technology

Figure 9:
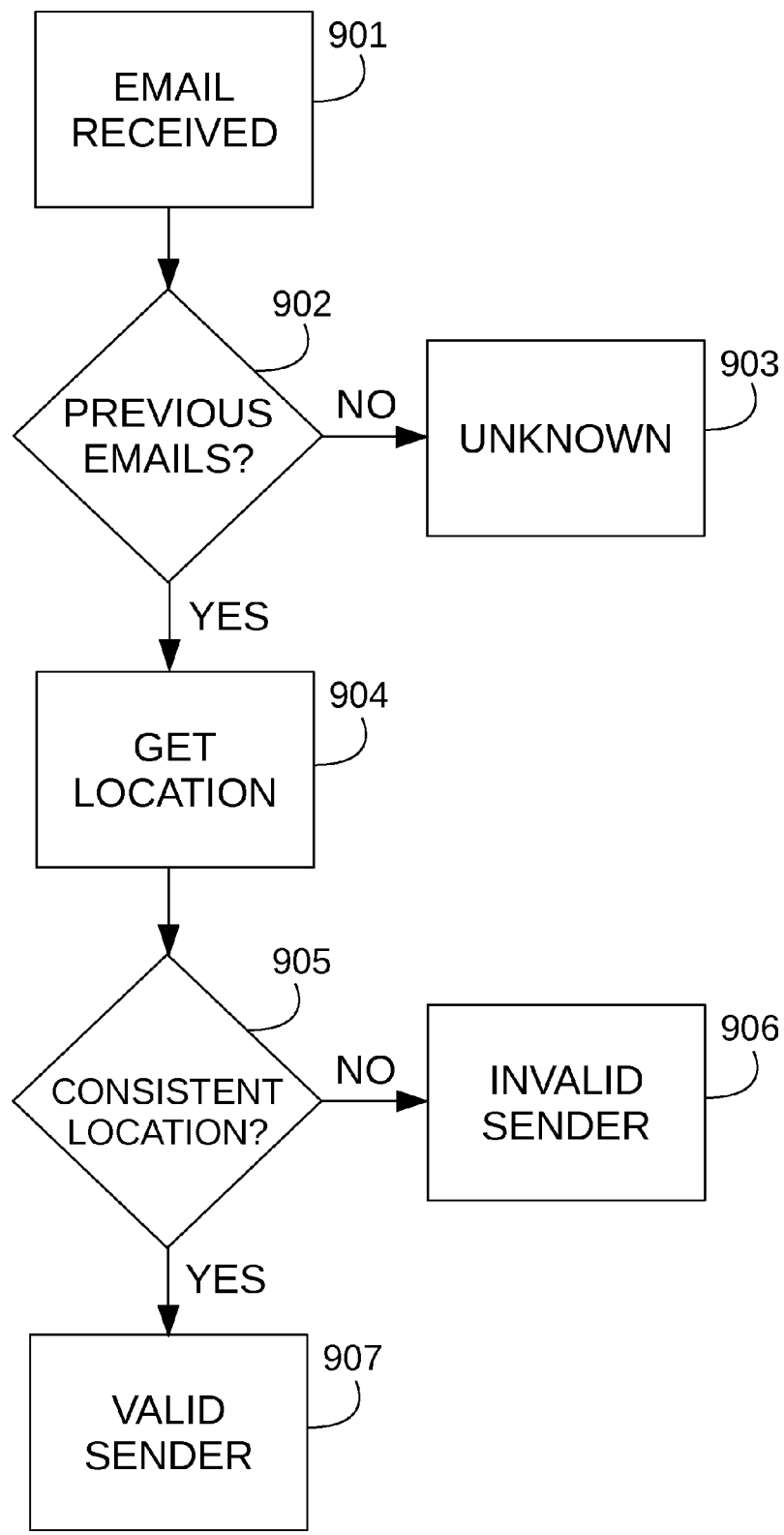
FIG. 9 is a flowchart detailing steps undertaken by an application server to verify an originating email sender by verification of the sender's location through IP address location technology according to embodiments of the present invention.

The originating sender's email may include a header that identifies the originating sender's public IP (Internet Protocol) address. Using IP location technology, the originating sender's geographic location may be determined with fairly high accuracy. Referring to FIG. 9, when the application server 106 receives an email from a sender 102 (step 901), it will determine if the sender 102 has previously communicated with any service subscriber 104 successfully (step 902). If the sender 102 has not previously communicated with any service subscriber 104, the validity of the sender 102 remains unknown (step 903). If the sender 102 has communicated with any service subscribers 104, the application server 106 will gather all previous locations for the sender 102 from the database 108. The application server 106 communicates the IP address to a location service (e.g., Digital Envoy's NetAcuity service) to determine the current geographic location of the sender 102 (step 904). If the application server 106 determines that the sender 102 has historically been geographically located in the same location as the sender 102 is currently in (step 905), the sender 102 is identified as valid (step 907). Otherwise, the sender 102 is considered invalid (step 906). In an aspect, success or failure of the verification method may require additional verification checks to be certain of a final disposition.

Verification of the Originating Sender's Email Relevant Header Information

Figure 10:
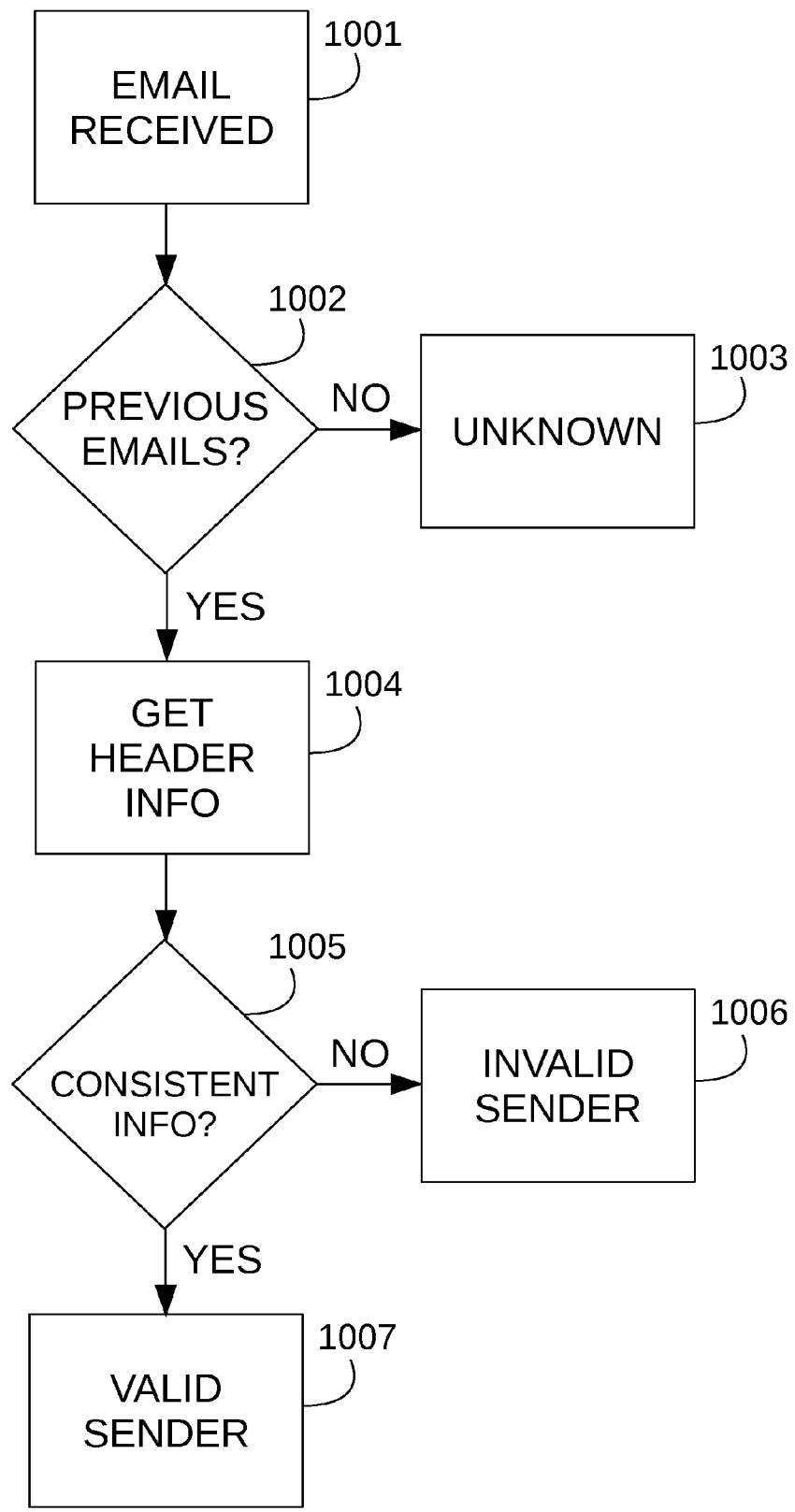
FIG. 10 is a flowchart detailing steps undertaken by an application server to verify an originating email sender through verification of the originating sender's email relevant header information according to embodiments of the present invention.

The originating sender's email may include header information that identifies information about the sender including, but not limited to, their email client name and version, their operating system, their Internet service provider, etc. Referring to FIG. 10, when the application server 106 receives an email from a sender 102 (step 1001), it will determine if the sender 102 has previously communicated with any service subscriber 104 successfully (step 1002). If the sender 102 has not previously communicated with any service subscriber 104, the validity of the sender remains unknown (step 1003). If the sender 102 has communicated with other service subscribers 104, the application server 106 gathers the header information for the sender 102 (step 1004). The header information is gathered from emails the sender 102 has previously sent which have been stored in the database 108. If the application server 106 determines that this sender 102 has historically consistent header information (step 1005), the sender 102 is reported as valid (step 1007). Otherwise, the sender 102 is considered invalid (step 1006). In an aspect, success or failure of the verification method may require additional verification checks to be certain of a final disposition.

After Sender Verification

Figure 11:
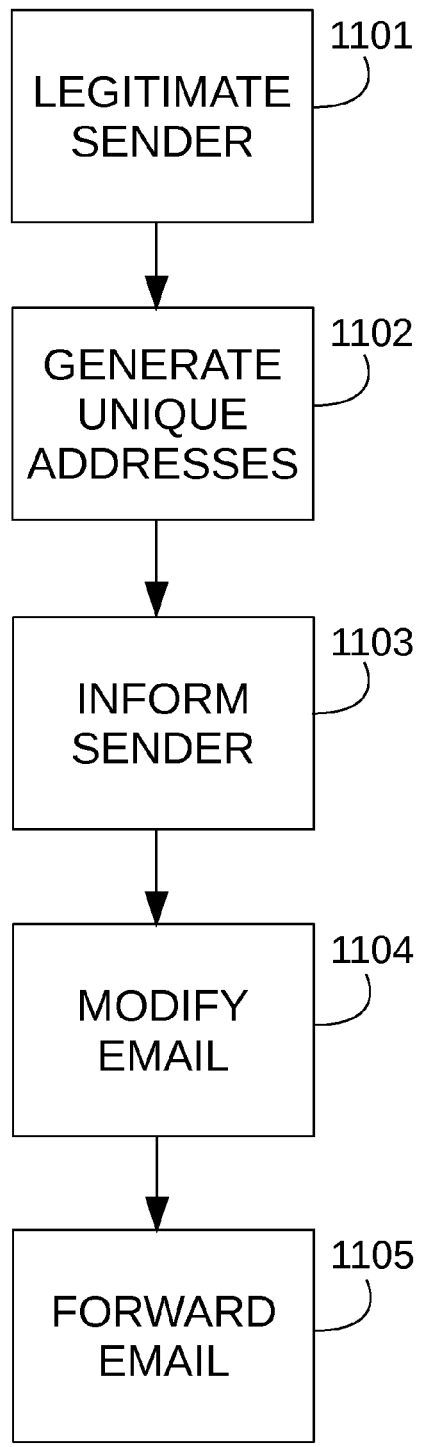
FIG. 11 is a flowchart detailing system operations for creating and storing unique email address associated with system users according to embodiments of the present invention.

As illustrated in the flowchart in FIG. 11, upon verification that the sender 102 is legitimate (step 1101), the application server 106 generates two unique email address (e.g., ab5df52ce@example.com and hc87djs31@example.com) (step 1102). The application server 106 will then store this information in the database 108. These two addresses are used for the sender 102 to communicate with the service subscriber 104 in the future and for the service subscriber 104 to communicate with the sender 102, t forcing all communication between the parties to pass through the service's email server 107 and application server 106 prior to delivery to the intended recipient.

The sender 102 is informed, via email or some other method, that future contact to the service subscriber 104 should be made via the assigned unique email address (e.g., ab5df52ce@example.com) (step 1103). In an aspect, the sender information may be integrated in any of the verification steps discussed above (e.g., step 303) (step 1103). The application server 106 then modifies the received email to change the sender 102 email address to the second mapped unique address (e.g., hc87djs31@example.com) (step 1104). The application server 106 also modifies the recipient address to the service subscriber's 104 real email address (step 1104). The application server 106 then transmits the email to the email server 107 for delivery to the service subscriber (step 1105). The application server 106 then transmits the email to the email server 107 using the service subscriber's 104 real email address. However, the "from" address of the email is indicated as a unique email address. This is done so that the service will receive the email response back and can then reverse the addressing (e.g. send to the original sender 102 using the unique address for the service subscriber).

If the service subscriber 104 responds to the sender's 102 email or when the sender 102 sends email to the assigned unique email address for a service subscriber 104, the email process is simplified because all the system operations of checking to make sure the sender 102 is valid, etc. will no longer be required for future communications as long as the sender 102 is associated with the unique email address. Otherwise, all of the steps of sender verification will occur as previously described.

Figure 12:
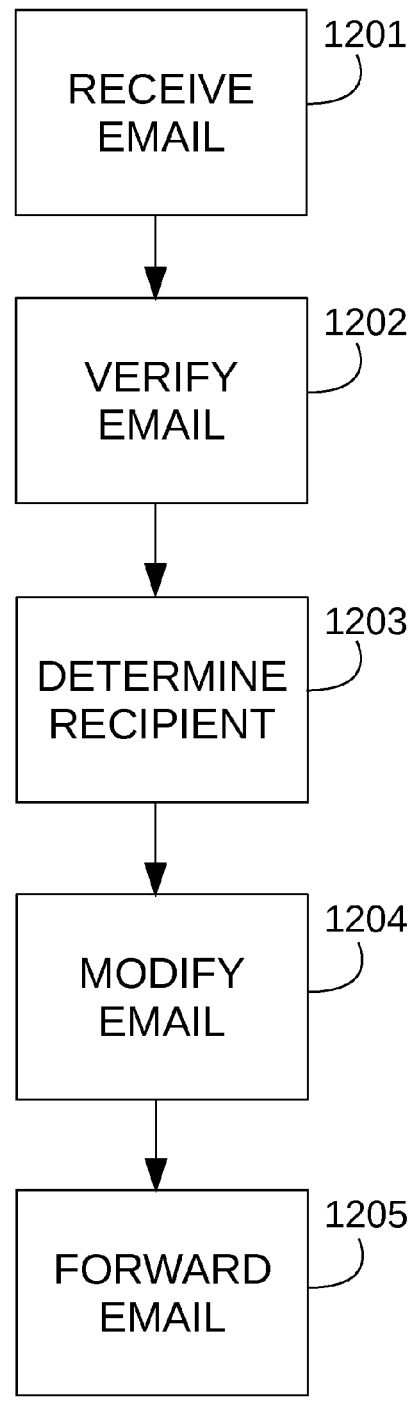
FIG. 12 a flowchart detailing system operations for processing email sent by a system user according to embodiments of the present invention.

Referring now to FIG. 12, after verifying sender 102 as a valid sender of an email, then generating and storing unique email addresses, the email server 107 receives the email and sends it to the application server 106 for processing (step 1201). The application server 106 checks the email to verity that it is legitimate (step 1202). Specifically, the application server 106 ensures that the email has not been and not spoofed or faked by some means. The application server 106 will then determine the recipient using the database 108 to translate from the unique email addresses to the standard email addresses (step 1203). The application server 106 modifies the email to reflect the real destination address (step 1204). If the email is from a service subscriber 104 to an external sender 102, the application server 106 changes the unique email address used for the external sender 102 to the sender's original email address. If the email is from an external sender 102 to a service subscriber 104, the application server 106 changes the unique email address used for the service subscriber 104 to the service subscriber's real email address. The application server 106 then passes the email to the email server 107 for forwarding and delivery (step 1205).

In an aspect, the sender 102, through their email address, is automatically approved to send email to the service subscriber 104 through this unique email address by the application server 106. Any future email from the sender 102 to this unique email address is automatically forwarded to the service subscriber 104 with only minimal delay to ensure validity of the email.

Figure 13:
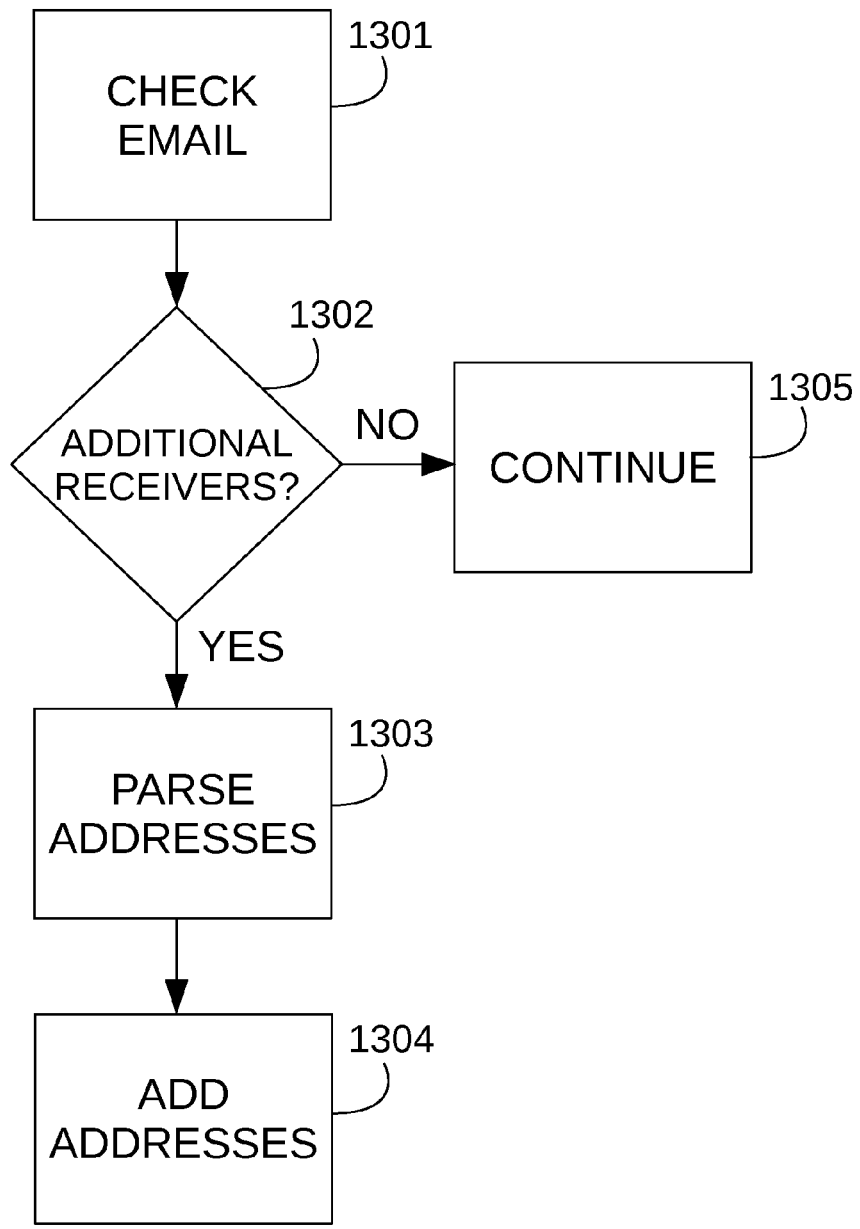
FIG. 13 is a flowchart detailing steps undertaken by system when an approved sender sends an email to a service subscriber according to embodiments of the present invention.

Referring to FIG. 13, when an approved sender 102 sends an email to a service subscriber 104, the email is checked for additional recipients via the "To:" or "Cc:" email headers (step 1301). If there are no additional receivers (step 1302), then the application server 106 continues processing the email (step 1305). If there are additional receivers on the email (step 1302), the application server 106 parses these addresses (step 1303). The application server 106 then adds these addresses to the database 108 for future permitted emails from those addresses to the current unique email address (step 1304). In an aspect, the service subscriber 104 can request the application server 106 disable this feature on an individual email, individual sender 102, or account basis based on their desires. If so requested, the application server 106 stores the setting in the database 108 for future reference.

Figure 14:
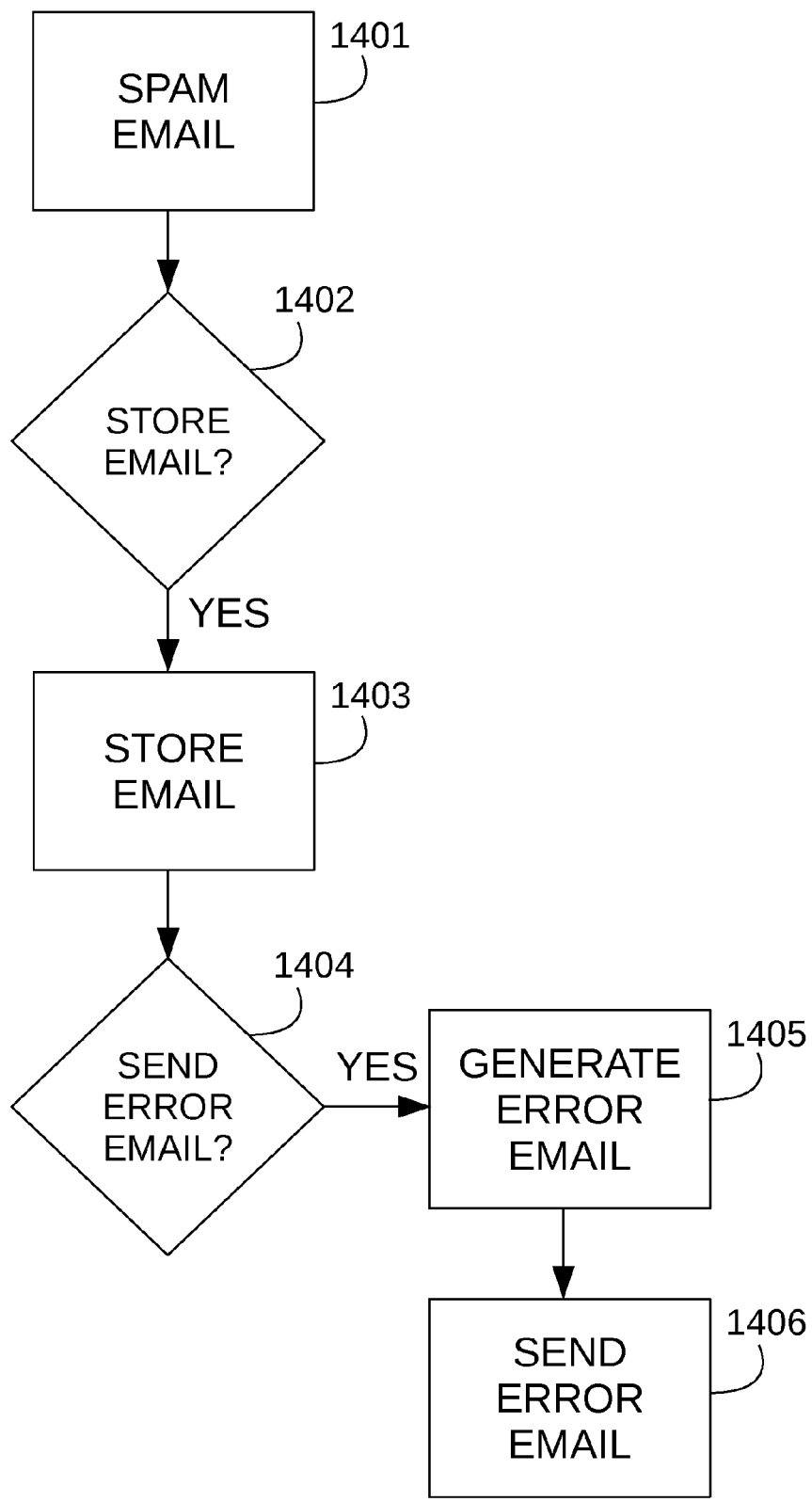
FIG. 14 is a flowchart detailing steps undertaken by system when an unapproved or illegitimate sender sends an email through the system according to embodiments of the present invention.

Referring to FIG. 14, if the sender 102 or email is illegitimate (step 1401), the email is rejected as spam and no new unique address is generated or assigned for the sender 102. If the application server 106 is set to store the email (step 1402), the email is stored by the application server 106 for future analysis, action, and/or informational logging in the database 108 (step 1403). If based on settings or analysis an error message is to be generated (step 1404) then the application server 106 will generate this email based on information in the illegitimate email (step 1405). The application server 106 then passes this error email destined for the sender 102 to the email server 107 for delivery (step 1406).

Figure 15:
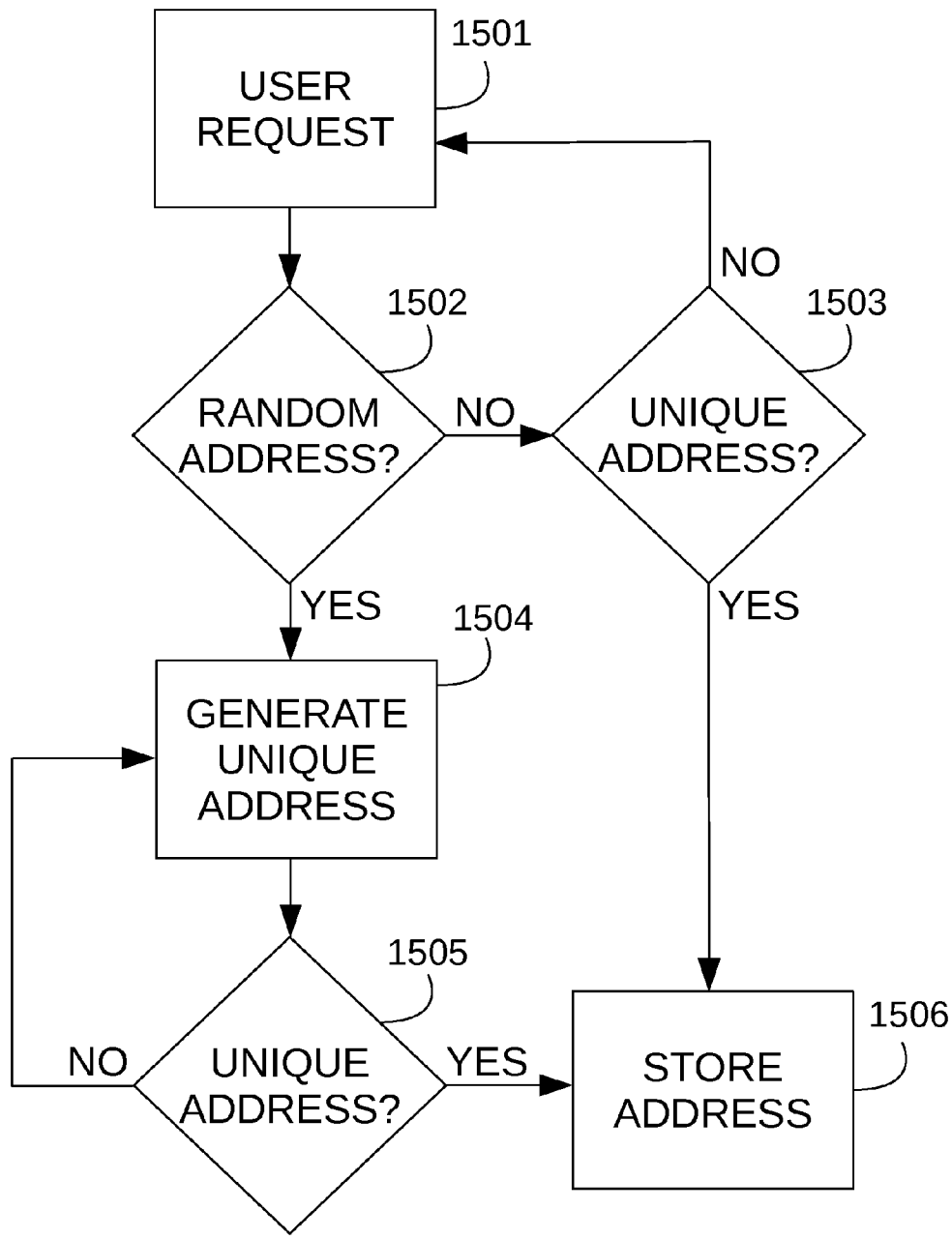
FIG. 15 is a flowchart detailing steps for generating unique email addresses on demand from a service subscriber according to embodiments of the present invention.

Referring to FIG. 15, another type of email address is the unique email addresses generated by the application server 106 when requested, on demand, by the service subscriber 104. In an aspect, a service subscriber 104 may cause the system to generate a unique random email addresses (e.g., b58fdec@example.com) or a user-generated unique email address (e.g., sanjayparekh@example.com) for use with online accounts, electronic newsletter subscriptions, etc. The service subscriber 104 requests the address generation through a command via email, a mobile application, a website, a web application, or some other appropriate method or system (step 1501). The application server 106 receives the request through the appropriate channel (via the email server 107 if the command was sent via email, etc.). Upon receiving the command, the application server 106 will determine if an address needs to be generated (step 1502). If the application server 106 is requested to use a user-generated unique email address, the application server 106 checks the database 108 to see if it is an unused, unique email address (step 1503). If the address is not unused and/or unique, the application server 106 directs the user to make a request for a different email address (step 1501). If the email address requested by the service subscriber 104 is a unique random email address, the application server 106 generates a unique address (step 1504). If the generated address is not unique (step 1505), the application server must generate another new unique address until it finds an address that is both unique and unused in the database 108 (step 1504). Once the application server 106 has a unique email address in either case (random or user-generated), the application server 106 stores the address in the database 108 (step 1506), thus, the tying/associating the unique email address to the current service subscriber 104. In an aspect, user-initiated unique email addresses may be used to remember what the email address was used for. For example, sanjayonyahoo@example.com or yahoo@example.com would be easy for the service subscriber 104 to remember that the address was used on Yahoo.

In an aspect, user-initiated unique email addresses that are initially stored in the database 108 by the application server 106 will not have approved Internet users 102 associated with them. Therefore the application server 106 marks such addresses in the database 108 as accepting of emails from any sender 102. The application server 106 will then remain in an accepting status for the user-initiated unique email address until some predetermined trigger including, but not limited to, the first email received from an external sender 102, some number of unique senders 102 have sent emails to the user-initiated unique email address, or some amount of time, determined either by the application server 106 or the service subscriber 104, has elapsed since the user-initiated unique email address was generated.

Figure 16:
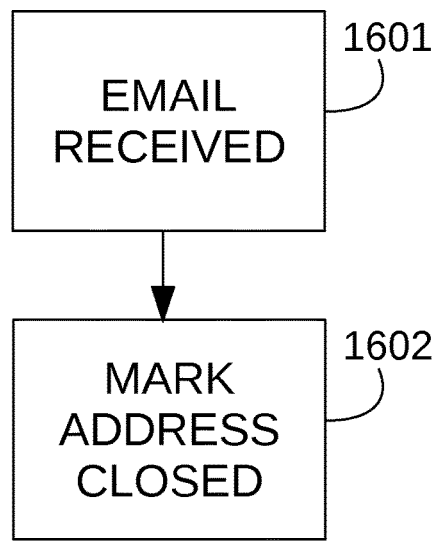
FIG. 16 is a flowchart detailing steps for managing a unique email address when the address is set to close after a first email is received from a sender according to embodiments of the present invention.

Referring now to FIG. 16, in an aspect, if the address is set to close after the first email received from a sender 102, the first email to the unique email address generated by the user will be accepted by the application server 106 (step 1601). The application server 106 will then mark the user-initiated unique email address in the database 108 as closed to any additional senders 102 (step 1602). Specifically, the user-initiated unique email address will be marked closed unless they are appropriately added through an introduction (as described in FIG. 13).

Figure 17:
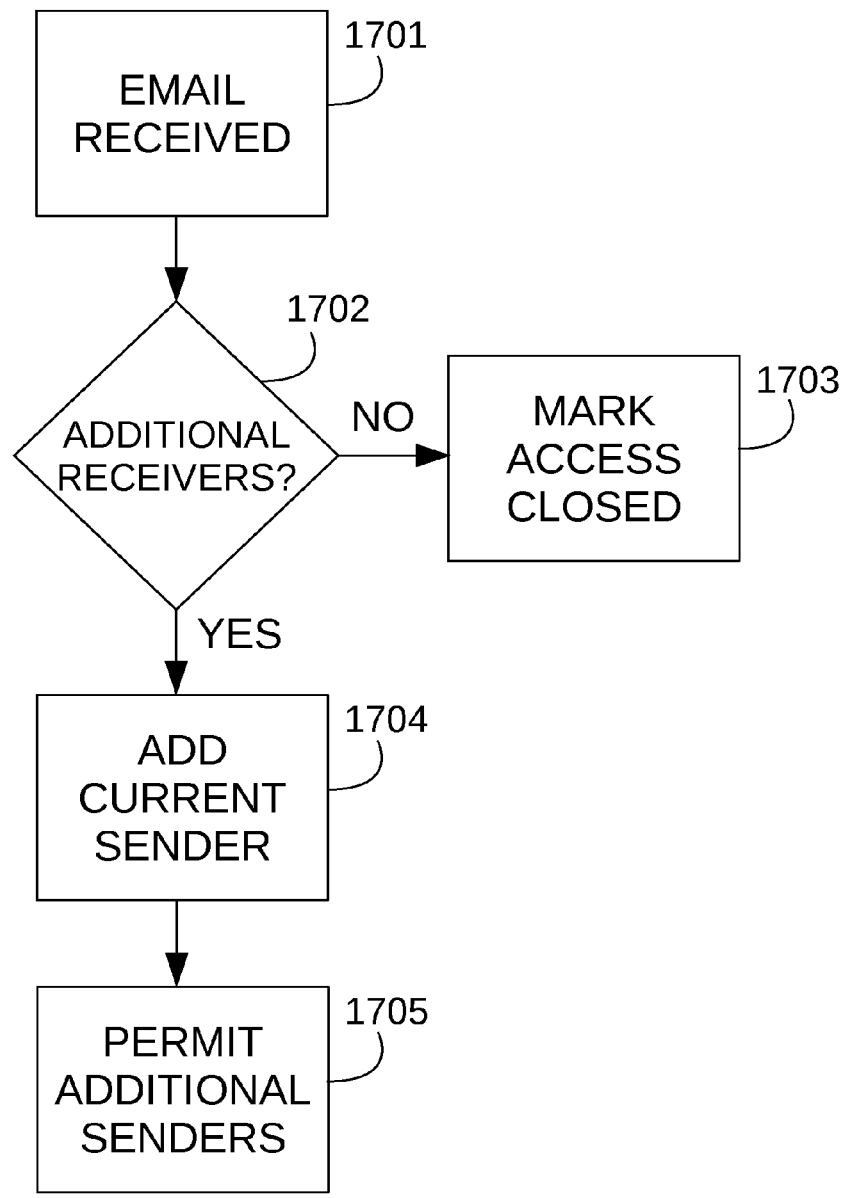
FIG. 17 is a flowchart detailing steps for managing a unique email address when the address is set to close after some number of unique senders is received according to embodiments of the present invention.

Referring to FIG. 17, if the address is set to close after some number of unique senders 102 are received, the application server 106 will received emails on this unique email address (step 1701). The application server 106 will track the number of unique senders 102 that have sent correspondence to the service subscriber's 104 unique email address. The information is tracked by the application server 106 and stored in the database 108. Once application server 106 adds an approved sender 102 to the unique email address the application server 106 checks the number of permitted senders that are set for the address (step 1702). In an aspect, if the record of the service subscriber's 104 unique email address has reached the limit of predetermined permissible senders 102, then the unique email address is set to be closed for additional senders (step 1703). If the limit of permissible senders 102 has not been achieved for the unique email address, the application server 106 adds the current sender to this unique email address's list of permitted senders in the database 108 (step 1704). The application server 106 will continue to allow additional senders for the unique email address (step 1705).

Figure 18:
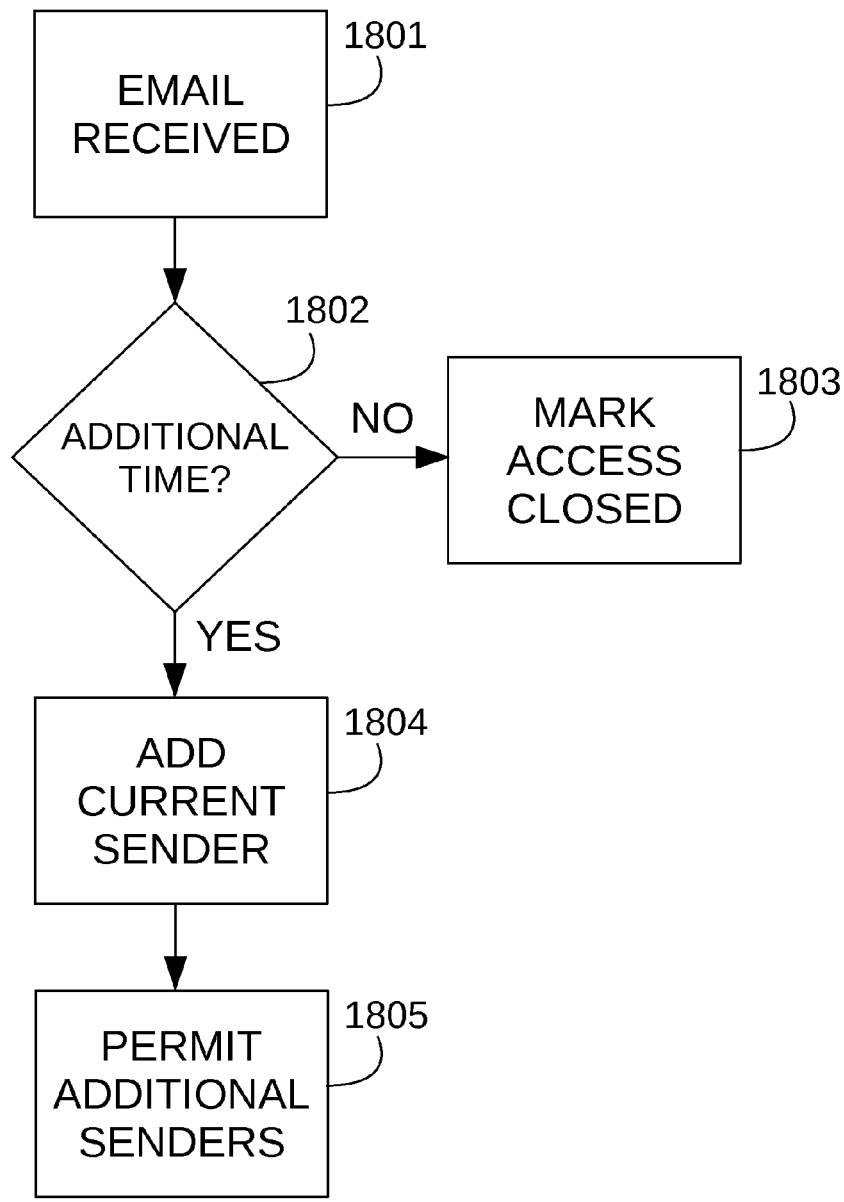
FIG. 18 is a flowchart detailing system operations when a unique email address is set to close after a certain amount of time according to embodiments of the present invention.

Referring to FIG. 18, if the unique address is set to close after a certain amount of time, the application server 106 accepts emails to the unique email address (step 1801). The application server 106 checks if the time limit for acceptance on the address has passed (step 1802). If the time has expired, the application server 106 marks the address closed for additional senders (step 1803). If the service subscriber's 104 unique email address is in an acceptance mode, any sender 102 to this address is automatically approved for future email traffic by the application server 106 and stored in the database 108 (step 1804). As such, any sender 102 would not be required to authenticate their address unless the application server 106 detects an issue with the sender 102. The application server 106 will continue to accept additional senders to the unique email address until the time limit has elapsed (step 1805).

In an aspect, when any email is received by the application server 106 from the email server 107 that is verified to be legitimate and should be forwarded to a service subscriber 104, the email will be modified. The email will be modified such that replies from the service subscriber 104 are sent from the service user's 104 mail server 105 to the service's email server 107 to be processed by the application server 106. The application server 106 then changes the service subscriber's 104 email address from their real address to the unique random email address known to the external Internet user 102. For example, if a sender 102 sends an email to a service subscriber's 104 unique email address (e.g., <s6fh2f@example.com>) and the application server 106 determines the email is legitimate, the application server 106 will forward the email to the service subscriber's 104 real email address (e.g., <myrealaddress@myrealdomain.com>). The application server 106 then changes the address of the sender 102 from their real address (e.g., <realsender@realsenderdomain.com>) to a unique service address (e.g., <jvuw63@example.com>). The change is so that if the service subscriber 104 (in this example, <myrealaddress@myrealdomain.com>) replies, the email will be sent through the application server 106 via the specific address (in this example, <jvuw63@example.com>). Before sending a reply back to the Internet user 102, the application server 106 changes the service subscriber's sending email from their real address to the unique address known to the Internet user 102. As such, the application server 106 will mask the service subscriber's 104 email address and prevent the sender 102 from knowing the service subscriber's 104 real email address.

In an aspect, embodiments may revolve around a single Internet user 102 and single service subscriber 104 in an email. Other embodiments consider multiple Internet recipients 102 as well. If there are multiple recipients of an email, all recipient email addresses are modified by the application server 106 on both the inbound and outbound delivery of email to Internet users 102 and service subscriber 104 in order to protect the service subscriber's 104 real email address from being disclosed to any other user.

All email addresses used for the application server 106 may be on a communal domain name (e.g., example.com) or domain names may be assigned on a per service subscriber 104 or per group of service users basis (e.g., sanjayparekh.com). The application server 106 maintains a unified base of valid domain names and hostnames to be used for each service subscriber 104 in the database 108. For example, a large company (e.g., BigCompany.com) may provide their users generic addresses (e.g., sanjay@BigCompany.com) but allow for random, dynamic addresses to also be created (e.g., h54dsf@BigCompany.com) or allow the dynamic addresses to exist on a subdomain (e.g., h45dc@unique.BigCompany.com). All of this information is tracked by the application server 106 and managed/stored in the database 108. Thus, emails to such domains are sent to the service's email server 107 for processing and forwarding, as appropriate, by the application server 106.

The application server 106 is designed such that service subscribers 104 are able to more finely control forwarding of email to their inbox. Specifically, service subscriber 104 may disable any specific email address or specific Internet user 102 (with or without regard to the address the sender is sending to) from having their emails reach the service subscriber's 104 real email inbox. If the service subscriber 104 selects this option, the service subscriber 104 sends an appropriate request to the application server 106. The application server 106 will then store the information in the database 108. When processing new incoming emails from senders 102, the application server 106 consults the database 108 to determine if the email address has been disabled or if emails from the sender 102 have been disabled by the service subscriber 104. If the application server 106 finds the service subscriber 104 has enabled such ability, matching incoming emails from Internet users 102 will not be forwarded to the service subscriber 104. As such, the rejected email may be silently deleted (i.e. automatically by the system) or the sender 102 may be notified (once or each time they attempt to email the service subscriber 104) that their email is not being delivered to the intended recipient. Such notification to the sender 102 is configurable by either the service subscriber 104 or set as a service wide default setting within the application server 106.

Email Encryption

In an aspect, the application server 106 sits between all email communication between service subscribers 104 and Internet users 102. As such, service subscribers 104 can enable full or partial email encryption on their emails. If a service subscriber 104 desires use of encryption technology (e.g., PGP a.k.a. Pretty Good Privacy, but not limited to PGP), they may enable settings in the application server 106 such that the service will encrypt all or some of their emails. When a sender 102 sends a plaintext (i.e., unencrypted) email to a service subscriber 104, the application server 106 will detect the plaintext email. If the service subscriber 104 has previously set the email from the service to be encrypted, the application server 106 will encrypt the email message appropriately before forwarding the email to the service subscriber's 104 destination inbox on the service subscriber's 104 email server 105.

In an aspect, for some encryption technologies, such as PGP, the application server 106 will need to have previously stored encryption keys in the database 108 to ensure proper operation of the encryption of emails. For other encryption technologies, the application server 106 may need other required information stored in the database 108 in order to encrypt emails securely prior to delivery.

Preventing Unintended BCC Replies

Email users have the ability to "BCC" (blind carbon copy) users on outgoing emails. When this is done, named recipients (in the "To" or "Cc" lines) of the email do not know that others also got a copy of the email. This behavior can be exposed if someone who is blind carbon copied (BCC'd) on an email replies to the email thus exposing the fact that they were originally BCC'd on the email.

The application server 106 protects service subscriber 104 from unintentionally responding to emails they were BCC'd on and may not want to respond to. For emails that are sent to a service subscriber 104 where they were BCC'd, the application server 106 generates a unique email address set for every recipient of the email. The application server 106 will generate a unique email address set even if blind carbon copied recipients already have unique email addresses generated for them, and stores this information in the database 108. If a service subscriber 104 responds to an email, the application server 106 can identify that the response is to an email that the service subscriber 104 was BCC'd on and was not a named recipient. If the application server 106 detects this type of reply from a service subscriber 104, the application server 106 will contact the service subscriber 104 via email or some other communication mechanism. The application server 106 will request the service subscriber 104 to verify their intention was to respond to an email they were BCC'd on. If the service subscriber 104 responds positively, the application server 106 will send the email response from the service subscriber 104 to the intended recipient Internet user or users 102. If the service subscriber 104 responds negatively, the application server 106 will delete the email response from the service subscriber 104.

Spam Detection

In an aspect, the application server 106 continually analyzes received unwanted emails (spam) in order to determine the source of leaked information. By analyzing who has access to each unique email address an analysis on potential perpetrators is possible. For example if email address <first@example.com> has approved senders Alice, Bob, and Charlie and the email address <second@example.com> has approved senders Charlie, Dot, and Elise. If both addresses receive spam but no other email addresses that include Alice, Bob, Dot, or Elise do then this means that Charlie was the probable source of the email addresses leaking out to spammers. Such analysis may need to be performed iteratively many times in order to narrow down to a single suspected leaker of information. This may have happened through information intentionally being supplied to spammers or an unintentional leak or Charlie's email account being compromised by hackers. The two email addresses do not necessarily have to belong to a single service user 104 of the system but may be in use across one or more service users 104. The application server 106 analyzes all spam email information. The database 108 stores such information. Either on each spam being received and/or at regular analysis intervals, the application server 106 interrogates the database 108 in an effort to determine the source of spam emails by analyzing which Internet users 102 would have knowledge of which email addresses provided by the application server 106.

Email Based Social Network

In an aspect, the application server 106, over time, will develop a network of Internet users 102 that the service subscriber 104 has communicated with stored in the database 108. Such a network can then be used to create associations. Specifically, it can help the service subscriber 104 determine the people that they know and who to ask for introductions. For example, if the service subscriber 104 requests a connection to a specific individual (a Internet user 102 or another service subscriber 104), the application server 106 queries the database 108 for a list of everyone that the service subscriber 104 has communicated with. Those people are then in turn queried to determine the list of people they know through email communications stored in the database 108. This process can be limited to a number of connections or be unlimited for an exhaustive search. If an association/path is found between the requesting service subscriber 104 and the target individual, the application server 106 can inform the service subscriber 104 of a means to obtain an introduction. In an aspect, the introduction may or may not be facilitated by the application server 106 through email requests, or other means, to each person in the chain between the service subscriber 104 and their target individual.

Email Based Geographical Location Identification

In an aspect, the application server 106 may, over time, maintain an updated list of the geographic location of Internet users 102 that the service subscriber 104 has communicated with stored in the database 108. The geographic location of Internet users 102 may be determined by looking at emails from each Internet user 102 and determine the user's sending machine IP address based on the Internet user's 102 email headers. The application server 106 will take this IP address and submit it to a service that maps IP addresses to geographic locations. The Internet user's 102 current geographic location may then be stored in the database 108. In an aspect, the application server 106 may store just the current geographic location of the Internet user 102 or the Internet user's 102 geographic location over time in order to better understand that user's historical geographic locations. If a service subscriber 104 wishes to contact all of the Internet users 102 within a geographic location who they know, the application server 106 can query that service subscriber's 104 contacts and provide a relevant list of Internet users 102. The application server 106 may provide this geographically bound Internet user 102 list or allow the service subscriber 104 to contact those relevant Internet users through a dynamic mailing list. The application server 106 may provide the service subscriber 104 the ability to query the geographic location of Internet users 102 on a country, region, state, city, sub-city, network provider, or some other combination of location, user features (e.g., email client, operating system, last contact, etc.), and other per Internet user 102 variables that may be possible to determine and collect by the application server 106.

While several illustrative embodiments of the invention have been shown and described, numerous variations and alternative embodiments will occur to those skilled in the art. Such variations and alternative embodiments are contemplated, and can be made without departing from the spirit and scope of the invention as defined in the appended claims.

What is claimed is:

1. A system that enables email communication and privacy while detecting information theft, the system comprising:
   an application server; and
   an email server configured to:
      accept email from at least one sender for delivery to at least one of a plurality of service subscribers, wherein the plurality of service subscribers have subscribed to use the system and the at least one sender has not subscribed to use the system; and
      transfer the email to the at least one service subscriber from the at least one sender to the application server, wherein the application server is configured to:
   determine whether the at least one senders is a valid sender or an invalid sender; and
   force all email communication between the at least one sender and the at least one service subscriber through the email server, wherein the email server is configured to provide unique email addresses by:
      calling upon the email server to generate at least a first and second unique email address, wherein the first unique email address is for use of communications from the valid sender to the email server and the second unique email address is for use of communications from the email server to the at least one service subscriber;
      linking the at least first and second unique email addresses to the original email addresses of the at least one service subscriber and the valid sender;
      modifying email messages between the at least one service subscriber and the valid sender with the first and second unique email addresses, wherein, after the application server has determined whether the at least one sender is a valid sender or an invalid sender, the email server is further configured to transfer email from valid senders to service subscribers and does not send emails from invalid senders to the service subscribers by forwarding the modified email messages from the valid sender to the at least one service subscriber.

2. The system of claim 1, wherein the application server is further configured to force all communication between the valid sender and the at least one service subscriber through the email server by providing unique email addresses for the valid sender and the at least one service subscriber to be substituted for original email addresses.

3. The system of claim 1, wherein modifying the email messages between the at least one service subscriber and the valid sender further comprises:
   calling upon the email server to email to the valid sender the first unique email address for further communication from the valid sender to the at least one service subscriber; and
   upon receiving the email from the valid server addressed to the first unique address, modifying the email address of the valid sender in the email to the second unique email address and modifying the first unique address to the original address of the at least one service subscriber.

4. The system of claim 1, wherein the system further comprises a database, wherein the server application stores the first and second unique email addresses associated with the valid sender and the at least one service subscriber to the database.

5. The system of claim 4, wherein, if email from the valid sender to the at least one service subscriber contains additional recipients, the application server is further configured to parse email addresses of the additional recipients and add the email addresses of the additional recipients to the database to allow future emails from the email addresses of the additional recipients to the first unique email address.

6. The system of claim 1, wherein the first and second unique email addresses are generated randomly by the application server.

7. The system of claim 1, wherein the first and second unique email addresses are user-generated by the at least one service subscriber.

8. The system of claim 7, wherein the application server is configured to confirm user-generated first and second unique email addresses.

9. The system of claim 1, wherein the email server is further configured to communicate with at least one remote email server, wherein the at least one remote email server can be utilized by the plurality of senders and the plurality of service subscribers.

10. The system of claim 1, wherein the application server, upon identifying the at least one of the plurality of senders is an invalid sender, is configured to store email from the invalid sender as spam email.

11. The system of claim 10, wherein application server is further configured to notify the at least one of the plurality of service subscribers of the spam email.

12. The system of claim 1, wherein the application server, after determining the at least one sender is a valid sender, further determines whether the email sent by the valid sender to the at least one service subscriber is legitimate.

13. The system of claim 12, wherein the application server, upon determining the email from the valid sender is not legitimate, stores the email for later analysis.

14. The system of claim 12, wherein the application server, upon determining the email from the valid sender is not legitimate, creates an error email for delivery to the valid sender.

15. The system of claim 1, wherein, if the email from the valid sender to the at least one service subscriber contains additional recipients, the application server is further configured to parse the email addresses of the additional recipients and add the email addresses of the additional recipients the database to allow future emails from the email addresses of the additional recipients to the first unique email address.

16. The system of claim 1, wherein the application server is configured to determine whether the at least one sender of the email is sent by a valid user by:
  determining a sender address from the at least one sender;
  calling upon the email server to form a validation email;
  calling upon the email sever to send the validation email to the sender address of the at least one sender; and
  determining if the validation email was successfully delivered, wherein if the validation email was successfully emailed, the at least one sender is determined to be a valid sender, and wherein if the validation email was not successfully email, the at least one sender is determined to be an invalid sender.

17. The system of claim 1, wherein the system further comprises a web server and a database.

18. The system of claim 17, wherein the system is configured to determine whether the at least one sender of the email is sent by a valid user by:
  determining a sender address from the at least one sender;
  calling upon the email server to form a validation email containing a unique URL that links to the web server;
  calling upon the email sever to send the validation email to the sender address of the at least one sender;
  determining if the validation email was successfully delivered,
  wherein if the validation email was successfully delivered and the unique URL has been accessed, the at least one sender is determined to a valid sender, and
  wherein if the validation email was not successfully delivered or if the unique URL was not accessed within a determined time period, the at least one sender is determined to an invalid sender.

19. The system of claim 18, wherein the system is further configured to provide a page with a CAPTCHA challenge when the unique URL is accessed by the at least one sender, the web server provides the CAPTCHA challenge, wherein if the web server reports the CAPTCHA challenge as not solved, the at least one sender is reported as an invalid sender, and wherein the web server reports the CPATCHA challenge as solved, the at least one sender is reported as a valid sender.

20. The system of claim 17, wherein the application server verifies the at least one sender by:
  acquiring the email address of the at least one sender;
  querying the database to see if the email address of the at least one sender has been validated and stored in association with other email addresses of the plurality of service subscribers in the database; and
  validating the email address of the at least one sender if the address has been validated previously.

21. The system of claim 1, wherein the application server verifies the at least one sender by, after determining whether the email from the at least one sender supports domain key identified mail (DKIM) verification, determining if the DKIM verification is true or false, wherein if the DKIM verification is true, reporting the at least one sender as a valid sender, and wherein the DKIM verification is false, reporting the at least one sender as an invalid sender.

22. The system of claim 17, wherein the application server verifies the at least one sender by:
  acquiring the email address and public internet protocol address of the at least one sender;
  querying the database to see if the email address of the at least one sender has been validated and stored in association with other email addresses of subscribers in the database;
  determining a current location of the at least one sender by using the public internet protocol address;
  comparing the current location of the at least one sender to historic locations of the validated email address in the database; and
  validating the email address of the at least one sender if the current location is geographically located with the historic locations.

23. The system of claim 17, wherein the application server verifies the at least one sender by:
  acquiring the email address of the at least one sender;
    querying the database to see if the email address of the at least one sender has been validated and stored in association with other email addresses of subscribers in the database;
    comparing header information of the at least one sender to historic header information of the validated email address in the database; and validating the email address of the at least one sender if the header information is consistent with the historic header information.

24. The system of claim 1, wherein the application server verifies the at least one sender by, after determining whether the email of the at least one sender supports sender policy framework (SPF) verification, determining if the SPF validation is true or false, wherein if the SPF validation is true, reporting the at least one sender as a valid sender, and wherein the SPF validation is false, reporting the at least one sender as an invalid sender.

25. The system of claim 1, wherein the application server verifies the at least one sender by:
gathering email header information for the at least one sender, determining if the at least one sender has previously communicated with the at least one of the plurality of service subscribers, wherein if the at least one sender has previously communicated with the at least one of the plurality of service subscribers, the at least one sender is reported as a valid sender, and wherein if the at least one sender has not previously communicated with the at least one of the plurality of service subscribers, the at least one sender is reported as an invalid sender.

26. The system of claim 25, wherein the gathering email header information for the at least one sender involves gathering emails the at least one sender has previously sent which have been stored in a system database.

27. The system of claim 25, wherein the email header information includes at least: email client, operating system, or internet service provider information.

* * * * *